April 29, 1941.  L. COOK  2,240,244
CONTROL MECHANISM
Filed Sept. 1, 1938  3 Sheets-Sheet 1
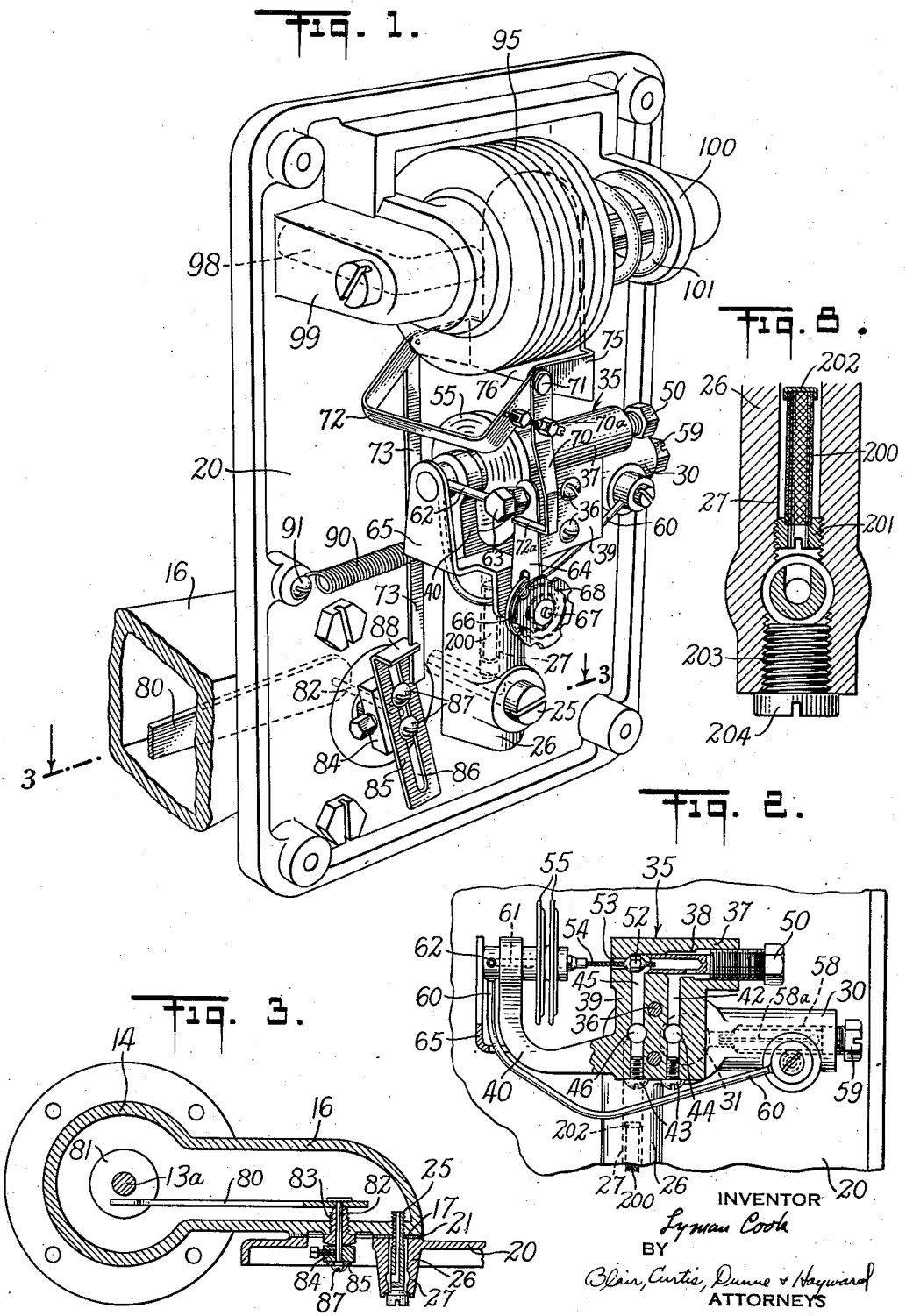
INVENTOR
Lyman Cook
BY
Blair, Curtis, Dunne & Hayward
ATTORNEYS April 29, 1941.    L. COOK    2,240,244
CONTROL MECHANISM
Filed Sept. 1, 1938    3 Sheets-Sheet 2
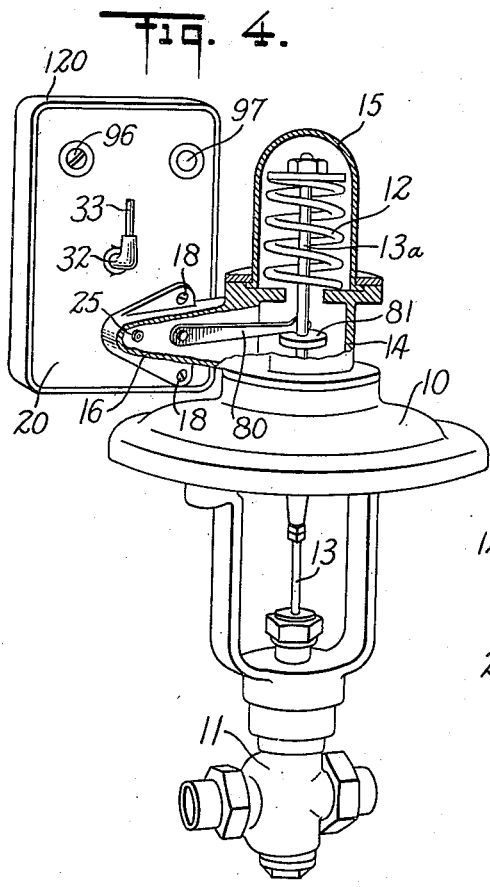
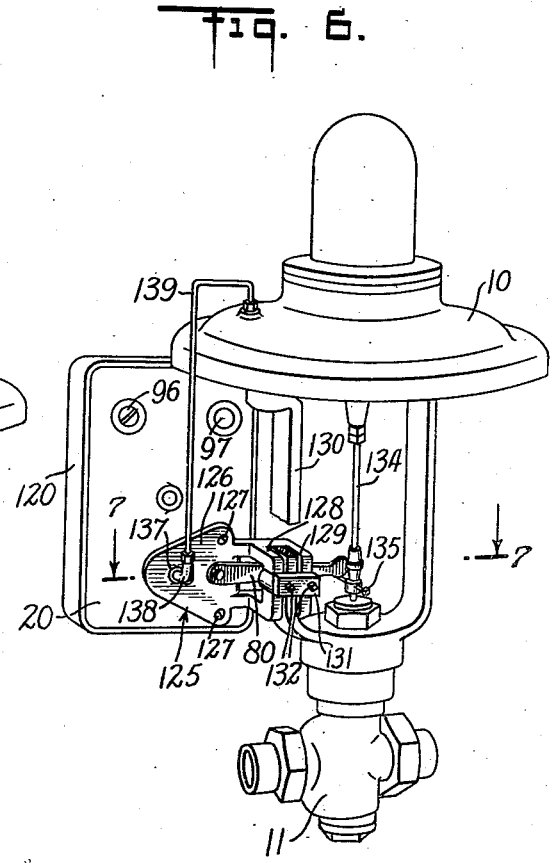
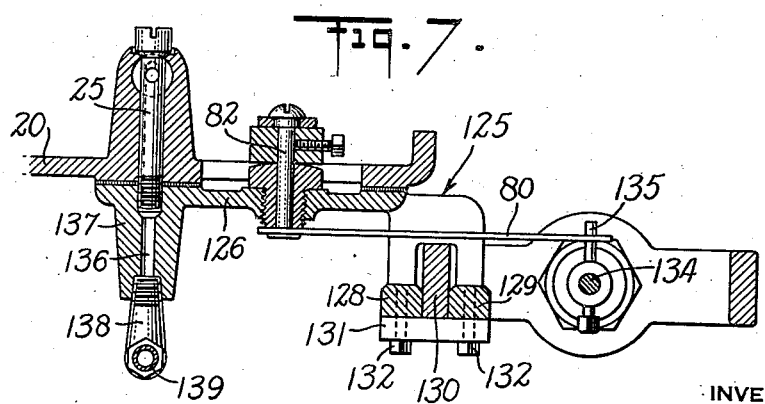
INVENTOR
Lyman Cook
BY
Blair, Curtis, Dunne + Hayward
ATTORNEYS April 29, 1941.  L. COOK  2,240,244
CONTROL MECHANISM
Filed Sept. 1, 1938  3 Sheets-Sheet 3

INVENTOR.
Lyman Cook
BY
Blair, Curtis, Dunne & Hayward
ATTORNEYS

Patented Apr. 29, 1941

2,240,244

UNITED STATES PATENT OFFICE 2,240,244

CONTROL MECHANISM

Lyman Cook, Foxboro, Mass., assignor to The Foxboro Company, Foxboro, Mass., a corporation of Massachusetts Application September 1, 1938, Serial No. 227,990

13 Claims. (Cl. 121—41)

This invention relates to improvements in control mechanisms, and more particularly to mechanisms of the character adapted to translate position into pressure or to translate pressure into position.

Among the general objects of the present invention may be noted the provision of control mechanism for positioning accurately an element in proportional correspondence with a control force, which is characterized by features of simplicity of design and operation, which is relatively inexpensive in manufacture and assembly, and which operates in improved manner to effect precise and accurate positioning of the element under adverse conditions of friction and like mechanical factors, working in opposition thereto.

More specifically, the invention seeks to provide an improved and simplified mechanism for accurately positioning an element responsively to a control force, in which the position of the element itself is utilized, jointly with the control force, to exercise control over the motive means for actuating the element, and in which the value or values of the force exerted by the motive means on the element is always such as to position the element accurately and in exact proportion to the control force, as determined by its particular setting. The present invention further contemplates a novel assembly of the control mechanism, the element to be positioned, and the motive means therefor which is mechanically simple and of improved design.

Other objects will be in part obvious and in part hereinafter pointed out in connection with the following analysis of this invention wherein is illustrated an embodiment of the invention in detail.

In the drawings:

Figure 1 is a perspective of certain parts of the control mechanism of the present invention;

Figure 2 is a part section through the valve body and related parts illustrated in Figure 1;

Figure 3 is a section taken along line 3—3 of Figure 1;

Figure 4 is a perspective of the assembly constituted by the control means, valve motor, and valve, as contemplated by the present invention;

Figure 6 is a perspective of a modified form of assembly;

Figure 7 is a section along line 7—7 of Figure 6;

Figure 8 is a detailed section of the strainer 200 shown in dotted lines in Figure 1.

Figure 5:
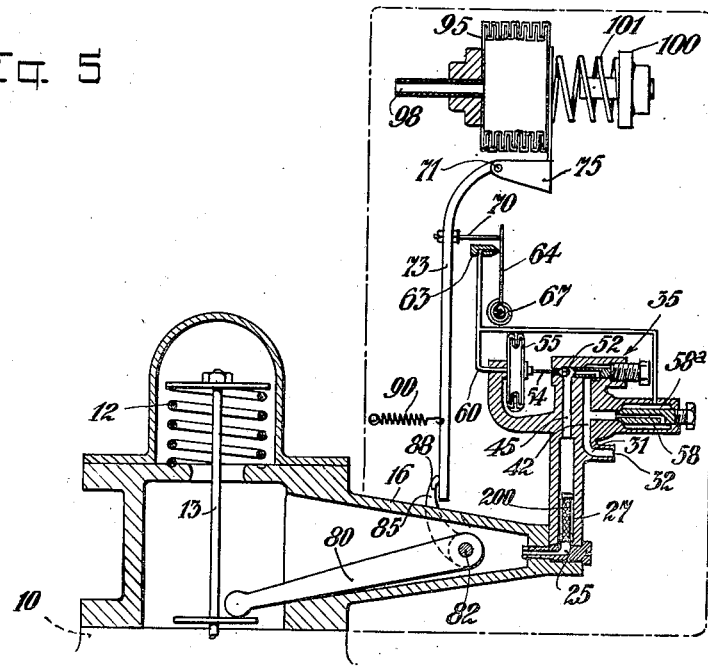
Figure 5 is a diagrammatic view showing the interconnection of the various air passages and showing also diagrammatically the linkage mechanism.

Referring to the drawings wherein like reference characters indicate like parts throughout the several views, and particularly to the embodiment illustrated in Figures 1-5, reference character 10 designates the enclosing casing of a pneumatic or diaphragm motor. The diaphragm thereof (not shown) is connected on one side to a valve stem 13 operating a valve not shown but contained in the valve body 11. On its other side the diaphragm is connected to a rod 13a which is connected to the top of spring 12. Thus air pressure on the top of diaphragm pushes down against the force of spring 12. The stem 13, rod 13a and the valve carried thereby (not shown) are representative of elements to be positioned responsively to a control force.

A spacing or supporting casing 14 and a cap 15 secured to part 14 in air-tight relation cover spring 12. Extending laterally from part 14 is a hollow extension 16 cast or otherwise formed to provide a flat face 17 against which is secured as by cap screws 18, the base or panel 20 of the control mechanism assembly, a gasket 21 being provided therebetween to secure the parts in air-tight relation. The hollow extension 16 and the part 14 thus provide with the diaphragm casing proper a pressure air chamber sealed to atmosphere and located above the diaphragm of the motor. The flat face construction of the extension part 16 further provides a simple and convenient means for mounting the base on the motor casing, thus to provide a compact assembly.

Pressure air is supplied to the chamber above the diaphragm through a bored plug screw 25, Figures 1 and 3, which, like cap screws 18, may also function to secure the base 20 to the casing extension. The plug screw 25 extends through the relatively vertical leg 26 of an L-shaped boss which is cast integrally with the base 20, the leg 26 being provided with a through bore 27 plugged at its lower end and extending in the direction of the length of the leg. The bore of the plug screw 25 is formed to communicate with the bore 27 of leg 26 and delivers into the hollow casing part 16.

Referring to Figure 2, extending into the horizontal leg 30 of the L-shaped boss, adjacent its junction with the vertical leg 26, is a pressure air inlet port 31, connection being made thereto at the back of panel 20 by a nipple 32 from an air line 33 supplied from a suitable source of pressure air.

Still referring to Figure 2, secured to the L-shaped boss and also adjacent the junction of its vertical and horizontal legs is a valve body or control head of known construction generally indicated at 35. The valve body consists of a barrel-shaped portion 37 which extends transversely and is axially bored as at 38 and from which depends a plate portion 39 through which securing screws 36 pass. An arm portion 40 extends laterally from the plate portion 39.

The depending plate portion 39 of the valve body is provided with spaced vertical bores, communicating with the bore 38 of the barrel portion 37. One plate bore 42 has its lower end closed by a screw 43 and intermediate its length is provided with a cross port 44 communicating with the air inlet port 31. The relatively leftwise plate bore 45 has its lower end closed by another plug screw 43 and intermediate its end is provided with a cross port 46 communicating with the bore 27 of vertical leg 26. Thus air entering through port 31 may pass through cross port 44 into plate bore 42 of the valve body and thence through barrel bore 38 into plate bore 45, thence into cross port 46 and bore 27, and thence to the diaphragm chamber of the valve motor through the bored plug screw 25.

Into one end of the bore 38 of the barrel portion 37 is threaded a plug screw 50 having an unthreaded tubular end portion terminating short of the other end of the bore. Air from the supply air bore 42 may pass into the tubular end of the plug screw, its passage therefrom to bore 45 being under the control of one side of a double valve 52, the other side of which controls the waste port 53 to atmosphere. Barrel portion 37 of the valve body and the valve and air passages therein thus constitute a control head of the supply and waste type for controlling the supply of pressure air to the motor, by establishing communication between air passages 42, 45, or for controlling release of pressure air from the motor as when valve 52 opens passage 45 to the waste port 53.

Valve 52 is carried by a stem 54 which is threaded so that the position of the valve thereon may be adjusted, the stem 54 being in turn carried by the diaphragm unit 55 whose condition of distension or collapse determines the position of valve 52. The diaphragm unit has its fixed end plate mounted on the upper end of arm 40 of the valve body and is arranged between the arm and the leftwise end of the barrel portion 37 of the body.

Thus the flow of air to and from the motor 10 is controlled by the valve 52. To prevent dirt that might be in the motor 10 from passing to and interfering with the valve 52 when the motor is exhausted, the bore 27 (Figure 8) is provided with a strainer unit 200. This strainer unit is mounted on and extends forwardly from a hollow, externally threaded support 201. The forward end of the strainer 200 is closed by a cap 202 so that the air in passing from one end of the bore 27 to the other end thereof passes through the strainer and through the hollow support 201. As shown in Figure 8, the strainer and its associated parts may be inserted through an enlarged bore 203 at the end of the bore 27 and which bore 203 is normally plugged by a plug screw 204.

Referring to Figure 2, pressure air from the inlet 31 also passes to bore 58 in the horizontal boss-leg 30, through a restriction 58a in a plug screw 59 which also closes both ends of the bore 58. Into bore 58 is connected a tube 60 which connects with the interior of the diaphragm 55 through a passage 61 formed in the arm 40 of the valve body. Tube 60 also connects with a tube 62 (Figure 1) carrying at its end the nozzle element 63 of a control couple of the nozzle and flapper type. The associated flapper 64 is pivotally carried at its lower end by a bracket 65 secured to the arm 40 of the valve body and is so biased by a spring 66 (shown largely in dotted lines) related to its pivot 67 that its upper free end tends to approach the nozzle 63. The flapper in moving against the nozzle varies the pressure back of the nozzle and in the diaphragms 55. The force of spring 66 may be adjusted through the adjusting nut 68.

Movement of the flapper 64 in a clockwise direction (Figure 1) is caused by movement of the arm 70 in a counterclockwise direction about its fulcrum 71. The arm 70 carries at its relatively lower free end an in-struck tongue 72a having edge contact with the flat face of the flapper 64 and so arranged that it engages the flapper adjacent the end of the latter and on the same side of the pivot 67 as the nozzle 63.

The arm 70 constitutes an element or second arm of a movement assembly which functions responsively both to the positioning of the rod 13a and to the control force in determining the position of flapper 64. In addition to the arm 70, this assembly includes a U-shaped cross link 72, one leg of which is fixedly secured in angular relation to the arm 70 by a micrometer adjusting screw 70a which provides for adjustment of the angular relation. The other leg of the cross link is fixedly secured to the long first arm 73 of the movement assembly. Flapper engaging arm 70, cross link 72, and long arm 73 thus operate as a bell crank having a pivoting axis extending through the spaced ears 75 (one of which is shown in full lines and the other in dotted lines) extending from the plate 76. The previously referred to fulcrum 71 falls on this axis.

The free end of the arm 73 of the movement assembly extends relatively downwardly for moving responsively to the position of rod 13a. To this end, another bell crank assembly is provided, one arm 80 of which operates in the motor casing part 14 and the extension 16 thereof, its free end engaging on a collar 81 carried by the rod 13a. The cross shaft 82, in the nature of an axle on which the bell crank may turn, extends through an air-tight journal bushing 83 threaded into the flat-faced wall 17 of the casing part 16. At its other end, which extends beyond the relatively outer face of the base 20, the shaft 82 carries a block 84 to which is secured an upwardly extending lever 85. The lever is provided with a longitudinally extending slot as at 86, and screws 87 extend through the slot into the block, thus to secure the lever in desired adjusted position. The free, upper end of the lever is turned over as at 88, an edge thereof being provided with a notch in which is slidably received the edge portion of the lower end of the arm 73 of the movement assembly. A spring 90 secured to a fixed point 91 of the base 20 and the approximate mid-portion of the arm 73 urges the free end of arm 73 into yielding engagement with the notched lever 85, and through the bell crank, of which lever 85 is a part, exerts yielding pressure in a downward direction on arm 80, thus insuring that this arm follows the position of the rod 13a. Accordingly, the bell crank measures the position of the valve stem 13 and positions the free end of arm 73 of the movement assembly in proportional correspondence therewith.

The fulcrum end of the movement assembly is positioned in accordance with a control force which is preferably provided by a regulated air pressure delivered to a hydron 95 through either of the control air inlet openings 96, 97 in the base 20 (Figure 4). Opening 96 is shown as plugged, air pressure thus entering opening 97 and being delivered to the interior of the hydron element through a passage 98 (Figure 1) formed in a mounting lug 99 extending from the relatively front face of the base 20. Also extending from the base and spaced from the lug 99 is a companion lug 100 forming an abutment for the spring 101 which reacts against the movable end plate associated with the hydron element of which the previously referred to plate 76 is an extension. The companion lug 100 is also provided with a passage similar to the air passage 98, but plugging of inlet opening 96 closes off this latter passage.

A regulated air pressure delivered to the hydron element 95 thus causes distension thereof against the force of spring 101, this distension being directly proportional to theh air pressure delivered to the hydron. As the hydron is distended, there results a frictionless setting of the hydron end plate 76 and hence of the pivoting axis extending through the connections or fulcrum 71 about which the movement assembly is turnable. It will be seen further that for every value of control pressure delivered to the hydron element, the fulcrum end of the movement assembly takes up a particular position directly related thereto.

By the above described arrangement the movement assembly functions to correlate stem position with the control pressure according to a fixed relationship. Thus a particular control pressure in the hydron 95 positions the pivoting axis of the movement assembly. Upon this position being established, arm 70 of the assembly acts through the flapper 64, the nozzle 63, and the valve 52 to supply air through the control head to the diaphragm motor at such pressure value or values as may be necessary to move the stem 13 until its position as measured by the bell crank arm 80, and hence the position of the free end of the arm 73, is in the position required by the fixed relationship. The combined movements of the bell crank moved by the valve stem and the fulcrum moved by the hydron are correlated by the nozzle flapper and the resultant action is always such as to keep the nozzle and flapper within an operative relation which allows for a variation in the order of only .001 inch at the flapper.

Referring to Figure 5, a complete operation of the instrument operating as a valve positioning device may be traced as follows: Assuming, first, that the pressure existing in the bellows 95 is constant and that the valve motor 10 has positioned the element 13 to bring the movement assembly into operating relationship with respect to the nozzle and flapper 63, 64 (to accomplish this the motor will have moved the element 13 until the flapper 64 is just tangent to the nozzle)—assuming the above, now assume that the pressure in the bellows 95 is increased. This causes the free end of the bellows to expand to the right against the pressure of the spring 101 and to position the rack 75 to the right of its previous position. This causes the lever or arm 70 to also move to the right and to pivot about the axis 71 and also tends to move the flapper 64 to the right and clockwise about its axis 67, thereby tending to uncover the nozzle 63. As this action of the movement assembly takes place, the lever 73 tends to pivot about its point of engagement with the lever 88 as an axis. But as the flapper 64 tends to move away from the nozzle 63, the pressure in back of the nozzle starts decreasing and the bellows 55 starts collapsing to move the valve 52 to the left, thereby restricting further escape of air from the valve motor and from the air inlet 31 and 32, so that the air pressure in the passageway 45, 46, 27, 25 and in the housing 16 starts building up higher than it was before, which causes the diaphragm to start pushing down against the action of the spring 12, so that the stem 13 starts moving downwardly. As the stem 13 starts moving downwardly, the free end of the following lever 80 (referring to Figure 1) is lowered, causing the shaft 82 and the lever 85 to move in a counterclockwise direction to follow the movement of the valve stem or element 13. This counterclockwise movement of the lever 85 is followed under the influence of the spring 90 by the long arm 73 of the movement assembly, so that the long arm 73 is given a motion in a clockwise direction and the short arm 70 is likewise given a movement in a clockwise direction, causing the flapper 64 to tend to approach the nozzle 63 and thereby starting the pressure in the bellows 55 to build up to move the valve 52 to the right to reduce the amount of air pressure then being supplied to the motor. This action of the short arm 70 on the flapper 64 and the influence of the valve stem 13 continues until the valve stem 13 is brought to a position in which the short arm 70 is so positioned as to maintain the flapper just tangent to the nozzle.

These actions and reactions take place rapidly and quickly balance out to position the valve stem in correspondence with the position of the movement assembly as determined by the value of the pressure in the bellows 95.

If it is assumed that the pressure in the bellows 95 is decreased, then the above described action takes place in the reverse, with the air pressure supplied to the valve motor being decreased instead of increased.

Under certain conditions of installation, it is necessary or desirable to reverse the action of the hydron assembly. To this end the hydron assembly and the spring 101 may be removed from the mounting lugs 99, 100 and its position reversed from that shown. Upon mounting the hydron assembly and spring in the reverse position, air pressure may be delivered to the interior of the hydron through the air inlet 96 and in this instance air inlet 97 is plugged Reverse actuation of the hydron to establish the setting of the axis on which the movement assembly turns accordingly results.

In addition to the surety and precision of action which the above described construction provides, its mechanical design and arrangement are such to make for inexpensive manufacture and ease in assembly. The mounting of the control head and the control means associated therewith on a single base into which all air connections are made and the securement of the base to the valve motor casing without substantial modification of the latter represents an exceedingly compact and simplified design. The construction of the valve body and the provision of air passages in the legs 26, 30, reduce to a minimum the necessity for pipe and tube connections with their consequent tendency to leak. Restrictions in the air passages are also substantially done away with and consequently the parts are permitted to respond to the varying pressures and movements without objectionable over-shooting or hunting.

Further, in the manufacture and assembly of the control parts carried by the base 20, the present design represents numerous advantages. Thus the valve body including the control head parts may be assembled complete. This is also true of the bracket assembly including the flapper and nozzle elements. Thereupon these sub-assemblies may be readily cooperated and mounted as a unit on the base 20 through the medium of the securing screws 36. Similarly the movement assembly may be connected up with the hydron assembly and thereupon secured in unitary manner to the base 20.

Figure 9:
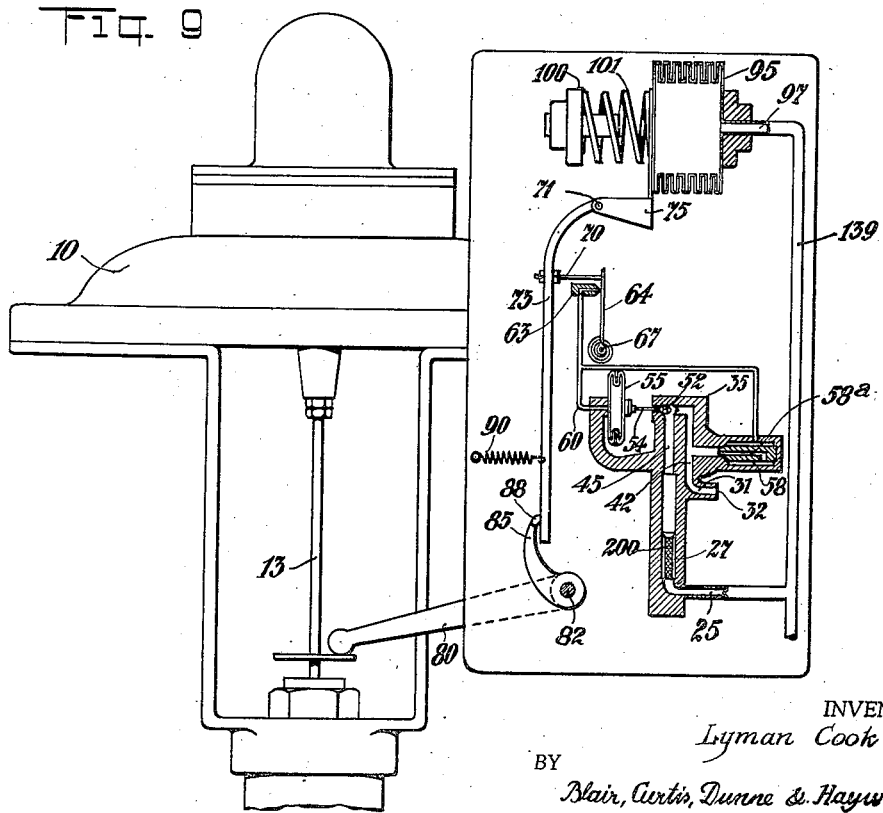
Figure 9 is a diagrammatic view of apparatus embodying the invention set up to translate position into an air pressure.

Referring now to the modified construction illustrated in Figures 6, 7 and 9, the control assembly is there shown as connected with and mounted on another type of valve motor whose casing lacks the parts 14, 16 characteristic of the Figures 1-4 construction. In the modified arrangement the base 20 has secured to its rear face a universal bracket member generally indicated at 125. This bracket member has a plate part 126 to which the rear of the base 20 is secured as by cap screws 127. The plate part extends somewhat beyond the side edge of the panel 20 and adjacent its end is provided with the spaced jaws 128, 129, between which one of the yoke members 130 of the motor is received. The depth of the mouth provided between the jaws is such that the edge of the yoke member engages against the base of the mouth, with the opposite edge of the yoke member being arranged substantially flush with the outer jaw faces. The cross plate 131 is thereupon secured to the jaw faces as by bolts 132 in such manner as to span the jaws and securely hold the bracket member 125 and hence the base 20 to the motor yoke 130.

The valve stem 134 carries a transverse pin 135 against which the bell crank arm 80 as previously described in connection with the Figures 1-4 construction may engage. This arm 80 causes turning of the bell crank about the axis of its axle member 82 also as previously described.

Inasmuch as there is present in existing motor casing construction no extension air chamber 16, the bored plug screw 25, as previously described, delivers to a passage 136 formed in a boss 137 on the bracket plate 126, into which boss is threaded the connecting nipple 138 of the air line 139 which delivers pressure air to the valve motor casing above the diaphragm thereof. By this arrangement pressure air from inlet 31 is supplied through the bored plug 25 and line 139 to the motor, at a value or values such that the valve stem 134 takes up a position in proportional correspondence to the control force, in the same manner as previously described in relation to the Figures 1-4 construction.

The control instrumentalities carried by the base 20 in the constructions above described may be protected by a cover 120 suitably cooperated with the base 20, as indicated in Figures 4 and 6, thus to prevent entry of dust to the various parts and mechanisms carried by the base 20. This cover will be readily removable so that repair and/or adjustment of said parts may be made when and if necessary.

Referring still to Figures 5 and 9, the control instrumentality may be arranged to translate position of the valve stem and its associated mechanism into pressure by making the following changes: the line 139 is disconnected from the valve motor and is connected through the passage 97 (Figure 1) to the bellows 95. Air supply from a suitable controlled source is connected with the diaphragm motor at the point from which the line 139 was removed. In this manner, movement of the valve stem causes a pressure to be created in the bellows 95 which pressure varies in accordance with the movement of the valve stem and its associated parts.

In Figure 9 this connection is diagrammatically shown. The control head and bellows 95 are now connected through passages 45, 46, 27, through the tube 25, through line 139 and passage 97. In this hook-up, the bellows 95 is reversed from its position as shown in Figure 1, to receive pressure from the passage 97 instead of from the passage 98 and so that the expansion of the bellows will move the rack 75 to the left instead of to the right, as shown in Figure 1. As before, movement of the valve stem 13 moves the lever 80 about the axis 82 and moves the long arm 73 of the movement assembly. The air pressure operating the valve motor will now be coming from some control instrument such as was supplying air to the bellows 95 when it was hooked up, as shown in Figures 1 through 5. Since the pressure existing in the bellows 95, when hooked up as a pressure transmitter, is proportional to position of the stem 13, by connecting a pressure-indicating instrument to the bellows 95 or to a line going to the bellows 95, the pressure therein may be read or recorded and calibrated in terms of valve stem position.

The operation of the instrument thus connected up may be described as follows: Starting with the parts in equilibrium condition, the pressure on the valve motor will be constant and the valve stem 13 stationary so that the arm 80, the arm 73 and the arm 70 will all be stationary, and the pressure existing in the bellows 95 will be proportional to the position of the valve stem and sufficient to keep the arm 70 so positioned as to maintain the flapper 63 tangent to the nozzle 64. Assuming now that the pressure on the valve motor is increased a certain amount, this will cause the valve stem to move downwardly and to take a new position. As it does so, the spring 90 reacting on the arm 73 and on the bell crank 85, 82 and 80 causes the free end of the arm 80 to follow the valve stem movement, giving a counterclockwise rotation to the arms 80 and 85 of the bell crank and giving a clockwise rotation to the arm 73 of the movement assembly. This movement of the arm 73 is transmitted through the U-shaft 72 to the short arm 70 of the movement assembly which also moves in a clockwise direction, tending to permit the flapper 64 to cover the nozzle. This action of the flapper 64 on the nozzle 63 tends to cause the pressure back of the nozzle to build up and to cause the bellows 55 connected with the nozzle through the passage 61 to expand. This expansion of the bellows 55 starts the valve 52 moving to the right, to reduce the area of the incoming high pressure air from the passage 31, passage 44 and the passage 42; and tends to open further the passage 45 to the atmosphere, and so tends to open the bellows 95 to the atmosphere, the bellows 95 being connected through the tubing 139, through the tube 25, through the passage 27 and through the passage 46 with the passage 45. This action starts reducing the pressure in the bellows 95 which then starts collapsing under the action of the spring 101, and moves the rack 75 to the right. This movement of the bellows and of the rack 75, acting through the short arm 70 of the movement assembly, acts on the flapper to maintain it tangent to the nozzle. The action and reaction of the parts balances out quickly so that practically the pressure in the bellows 95 follows closely the movement of the valve stem 13.

As many changes could be made in carrying out the above constructions, without departing from the scope of the invention, it is intended that all matter contained in the above description or shown in the accompanying drawings shall be interpreted as illustrative and not in a limiting sense.

I claim:

1. Control mechanism comprising, in combination, an element to be positioned, a pneumatic motor for actuating the element, a pressure air line to the motor, a control head in the line, a control couple of the nozzle and pivoted flapper type operatively related to the control head, a movement assembly including an arm pivoted at one end to turn about a movable axis and having its other end freely positionable, means for establishing frictionlessly the position of the pivoting axis of the arm in proportional correspondence with a control force, means for positioning the free end of the arm in proportional correspondence with the position of the element being positioned comprising a bell-crank assembly including spaced levers turnable about a fixed axis, one lever operatively following the position of the element and actuating the other lever to a position in correspondence therewith, and means urging the free end of the movement assembly arm into engagement with the other lever of the bell-crank assembly, the movement assembly including a second arm movable with the first arm and having its free end engaging the flapper intermediate its pivot and the nozzle and operative to position the flapper with reference to the nozzle.

2. Control mechanism comprising, in combination, an element to be positioned, a pneumatic motor for actuating the element, a pressure air line to the motor, a control head in the line, a control couple of the nozzle and pivoted flapper type operatively related to the control head, a movement assembly including an arm pivoted at one end to turn about a movable axis and having its other end freely positionable, means for establishing frictionlessly the position of the pivoting axis of the arm in proportional correspondence with a control force, means for positioning the free end of the arm in proportional correspondence with the position of the element being positioned comprising a bell-crank assembly including spaced levers turnable about a fixed axis, one lever operatively following the position of the element and actuating the other lever to a position in correspondence therewith, and means urging the free end of the movement assembly arm into engagement with the other lever of the bell-crank assembly, the movement assembly including a second arm movable with the first arm and so arranged that the edge portion of the free end thereof may slidably engage against a face of the flapper whereby to position the flapper with reference to the nozzle.

3. Control mechanism comprising, in combination, an element to be positioned, a pneumatic motor for actuating the element, a pressure air line to the motor, a control head in the line, a control couple of the nozzle and pivoted flapper type operatively related to the control head, a movement assembly including an arm pivoted at one end to turn about a settable axis and having its other end freely positionable, means for establishing frictionlessly the position of the pivoting axis of the arm in proportional correspondence with a control force, means for positioning the free end of the arm in proportional correspondence with the position of the element being positioned comprising a bell-crank assembly including spaced levers turnable about a fixed axis, one lever operatively following the position of the element and actuating the other lever to a position in correspondence therewith, and means urging the free end of the movement assembly arm into engagement with the other lever of the bell-crank assembly, the movement assembly including a second arm movable with the first arm and being arranged so that the edge portion of its free end may slidably engage against the face portion of the flapper intermediate its pivot and the nozzle whereby to position the flapper with reference to the nozzle.

4. Control mechanism comprising, in combination, an element to be positioned, a pneumatic motor for actuating the element, and a control assembly operatively related to the motor and including a mounting base carried by the motor, a pressure air inlet formed in the base, the base having a pressure air passage therein communicating with the inlet and delivering to the motor, a control head mounted on said base for controlling flow of pressure air through the passage, a movement assembly, means for setting frictionlessly one end of the movement assembly in proportional correspondence with a predetermined value of control air pressure including a hydron assembly carried by the base, a control air inlet formed in the base and communicating with the hydron assembly, and a connection between the hydron and movement assemblies, means extending through the base and operative between the element to be positioned and the other end of the movement assembly for positioning said other end in proportional correspondence with the position of the element, and a control couple carried by the base in operative relation to the control head, the control couple including a nozzle carried by the base and having an air connection with the pressure air inlet and a pivoted flapper associated with the nozzle, the movement assembly being operative to position the flapper with reference to the nozzle.

5. Control mechanism comprising, in combination, an element to be positioned, a pneumatic motor for actuating the element, and a control assembly operatively related to the motor and including a mounting base carried by the motor, a pressure air inlet formed in the base, the base having a pressure air passage therein communicating with the inlet and delivering to the motor, a control head mounted on said base for controlling flow of pressure air through the passage, a movement assembly, means for frictionlessly setting one end of the assembly in proportional correspondence with a predetermined value of control air pressure including spaced lugs extending from the base and each having a control air passage therethrough, a reversible hydron assembly mounted between said lugs, and a connection between the hydron and movement assemblies, means extending through the base and operative between the element to be positioned and the other end of the movement assembly whereby to position said other end of the assembly in proportional correspondence with the position of the element, a control couple carried by the base and operatively related to the control head, the couple comprising a nozzle having an air connection with the pressure air inlet and a pivoted flapper, the movement assembly being operative to position the flapper with reference to the nozzle.

6. Control mechanism comprising, in combination, an element to be positioned, a diaphragm motor for actuating the same including a casing, a control assembly mounted on a base and including a casing extension secured to the motor casing, a pressure air inlet in the base, the base having a pressure air passage delivering to the casing extension, a control head mounted on the base for controlling supply of pressure air from the inlet through the passage to the motor casing, a movement assembly, means for frictionlessly setting one end of the assembly in proportional correspondence with a predetermined value of control air pressure including a hydron assembly carried by the base, a control air inlet in the base delivering to the hydron assembly, and a mechanical connection between the hydron assembly and the movement assembly, means for positioning the other end of the movement assembly in proportional correspondence with the position of the element including a bell-crank lever mounted for turning on an axis extending through the casing extension, one arm of the lever operating in the casing extension to follow the position of the element and thereby setting the position of the other arm thereof and the other end of the movement assembly, and a control couple carried by the base and operatively related to the control head, the couple comprising a nozzle having an air connection to the pressure air inlet and a pivoted flapper operatively related to the nozzle, the movement assembly being operative to position the flapper with reference to the nozzle.

7. Control mechanism comprising, in combination, an element to be positioned, a diaphragm motor for actuating the element, the motor including a yoke, a bracket having one end secured to the yoke, a control assembly including a mounting base carried by the other end of the bracket, a pressure air inlet in the base, a pressure air connection between the base and the motor, the base having a pressure air passage from the inlet to the connection, a control head carried by the base for controlling flow of pressure air through said passage, a movement assembly, means for setting frictionlessly one end of the assembly in proportional correspondence with a predetermined value of control air pressure including a hydron assembly carried by the base, a control air inlet in the base delivering to the hydron assembly, means for positioning the other end of the movement assembly in proportional correspondence with the position of the element including a bell-crank lever turnable on an axis extending through the base, and a control couple carried by the base and operatively related to the control head, the control couple comprising a nozzle having an air connection with the pressure air inlet and a pivoted flapper, the movement assembly being operative to position the flapper with reference to the nozzle.

8. In a control mechanism for positioning an element movable by a pneumatic motor, in combination, a supply and waste valve for controlling the pressure supplied to said motor, a control couple including a fixed nozzle and pivoted baffle for operating said supply and waste valve, a movement assembly pivoted soley about a floating axis carried by the free end of a hydron expansible in accordance with a control force, means for positively driving the movement assembly about said axis including lever mechanism movable about a fixed axis and having an arm which follows the position of the element, resilient means for urging said arm to follow the movement of the element, said movement assembly being adapted to operate said flapper whereby said motor maintains an exact relationship between said element and the condition of expansion of said hydron, and means for adjusting the mechanical advantage between the movement assembly and the lever mechanism to adjust the relationship maintained by said motor between said element and hydron.

9. In apparatus for positioning an element in accordance with a pneumatic pressure, in combination, a pneumatically operated diaphragm motor having a cover and a cap over the diaphragm, a mounting base, a hollow extension between said cap and cover and supporting said mounting base, a source of air pressure, a non-restrictive passage in said mounting base and connecting said air pressure and said hollow extension, valve means supported by said mounting base controlling the air pressure to said motor through said passage, a movement assembly for operating said control means and so responsive to the position of said element and to said pneumatic pressure as to continuously control the air supply to the valve motor as to cause it to correlate the position of said element and said pneumatic pressure in accordance with a predetermined relationship.

10. The combination, with a diaphragm motor having a cover over the diaphragm, of a cap secured to said cover and housing a spring and rod movable with the diaphragm, a laterally extending casing between said cap and cover, control mechanism supported by said casing, a bearing supported by said casing, and a crank having a shaft rotatable in said bearing and having an arm movable with said rod, said arm being housed in said casing.

11. The combination, with a diaphragm motor having a cover over the diaphragm, of a cap secured to said cover and housing a spring and rod movable with the diaphragm, a laterally extending casing between said cap and cover, control mechanism supported by said casing, a bearing supported by said casing, a crank having a shaft rotatable in said bearing and having an arm movable with said rod, said arm being housed in said casing, and an air passage between said control mechanism and the entrance of said casing permitting the flow of air between said control mechanism and said diaphragm.

12. The combination, with a diaphragm motor having a diaphragm, a rod and a yoke for supporting said diaphragm with respect to said rod, of control mechanism mounted in the casing, means for supporting said casing on said yoke comprising a blade portion and a yoke portion adapted to receive the yoke portion of said diaphragm motor, and means for clamping the two yoke portions together.

13. Apparatus for causing a pneumatically operated motor to position an element in accordance with a control force by controlling the air pressure supplied to said motor, said apparatus comprising in combination a hydron having a free end and expansible in accordance with the control pressure, a pilot valve including a port and a movable restriction thereto, a single lever means pivotably carried by said hydron and directly contacting and adapted to operate said movable restriction, second lever means pivotable about a fixed axis slidably contacting and adapted to operate said first lever means, means mechanically connecting said second lever means to move with said element and means for resiliently holding said single lever means, said second lever means and said element in continuous operative contact, whereby said movable restriction is operated by the combined action of said hydron and said element, and a valve of the supply-and-waste type operated by said pilot valve for controlling passage of air to and from said motor.

LYMAN COOK.